April 18, 1944. R. KAUCH ET AL 2,346,689
WARPLANE
Filed July 9, 1941 2 Sheets-Sheet 1

INVENTORS
ROBERT KAUCH
CHARLES L. PAULUS
BY
ATTORNEYS

April 18, 1944.  R. KAUCH ET AL  2,346,689
WARPLANE
Filed July 9, 1941   2 Sheets-Sheet 2
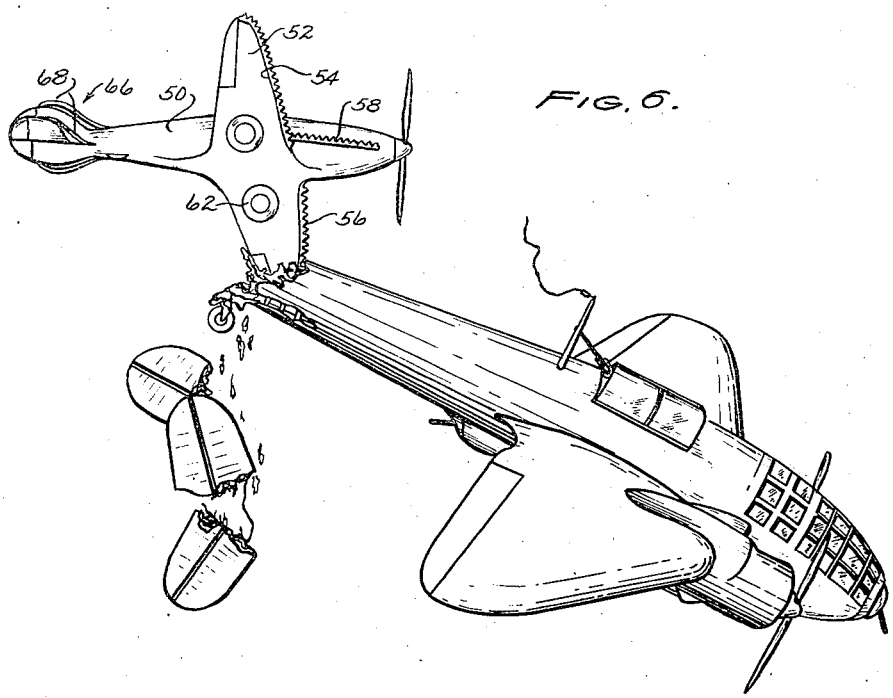
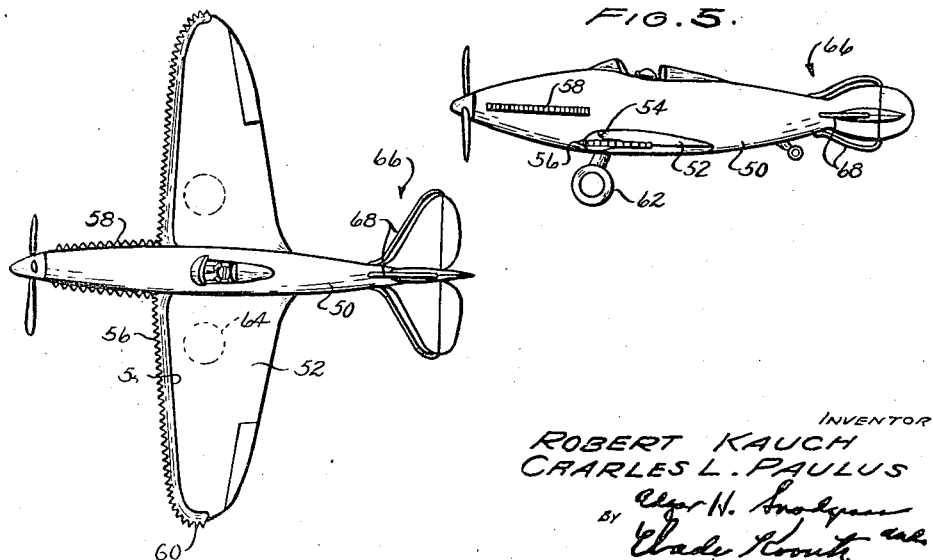
INVENTORS
ROBERT KAUCH
CHARLES L. PAULUS Patented Apr. 18, 1944

2,346,689

UNITED STATES PATENT OFFICE 2,346,689

WARPLANE

Robert Kauch, Maxwell Field, Montgomery, Ala., and Charles L. Paulus, Dayton, Ohio Application July 9, 1941, Serial No. 401,615

1 Claim. (Cl. 244—1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to aircraft and particularly to aircraft which carry or include destructive devices for use in aerial warfare.

Aerial warfare, as presently practiced, includes the use of bombs or machine guns in attacks on ground objects, and generally, the use of bombs, cannon or machine guns against other aircraft.

In attacks on enemy airplanes, however, the use of bombs is very seldom effective, since, due to the maneuverability of the enemy planes, the number of hits is very low.

Furthermore, the use of cannon is far from being all that could be desired, because, when the attacking craft is made heavy enough to carry cannon of any considerable size, and support them in action, it is then too heavy to have the requisite maneuverability for attack on alert, combat, and the smaller types of warplanes.

The use of machine guns in offensive aerial warfare is considered the most effective at the present time, but even this method is far from perfect, since a considerable number of shots may be delivered in a vital part of an enemy plane without causing it to fall out of control, with the result that it is landed safely and subsequently repaired and put back into service.

It is therefore an object of this invention to equip an airplane with means which, when brought into action, will totally wreck the attacked craft and cause it to fall out of control.

More specifically, it is an object of this invention to provide an airplane of the alert or pursuit type with a minimum of ballistic equipment, and that to be used for defensive purposes only, the weight thus saved permitting the use of heavily braced and strongly reinforced members capable of cutting or ramming and thus destroying an enemy craft without danger of the attacking warplane being seriously damaged.

Other objects and advantages will be discovered upon consideration of the following description, read with reference to the drawings, wherein;

Fig. 4 is a plan view of a variant form of the invention.

Fig. 5 is a side view of the variant form in normal flight.

Fig. 6 is a view of the variant form in an attack on an enemy plane.

Figure 1:
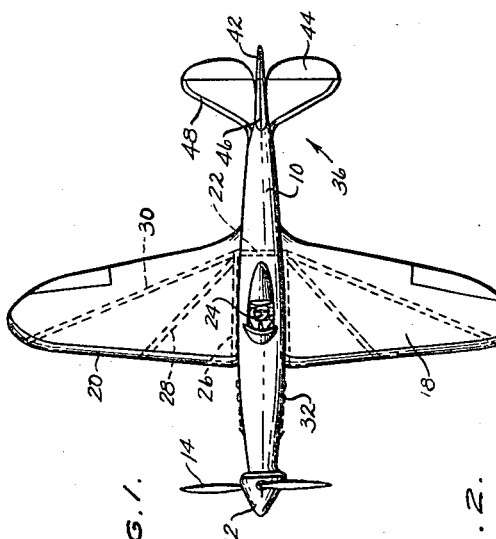
Fig. 1 is a plan view of one form of the invention.
Figure 2:
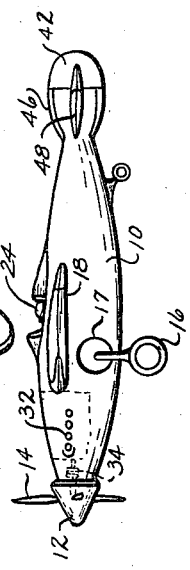
Fig. 2 is a side view of the same device in normal flight.
Figure 3:
Fig. 3 is a side view of the same device in attack.

In the embodiment shown in Figs. 1, 2 and 3, the fuselage 10 is of rather more than ordinary length and fashioned particularly at the front end, somewhat like an armor-piercing projectile. The propeller nose 12 is constructed of heavy armor plate and the propeller blades 14 are arranged to fold back from the flight position Figs. 1 and 2, to the attack or ramming position Fig. 3.

The landing gear 16 is retractable, being shiftable from the landing position shown in Fig. 2 to wells 17 within the fuselage. The retracted position is shown in Fig. 3.

The leading edges of the wings 18 are covered with relatively heavy armor plate channel members 20, which are in turn braced against a bulkhead 22 (see Fig. 1) in back of the cockpit 24, by the bracing members 26, 28 and 30.

In order that a heavy impact blow delivered by the nose 12, against an enemy craft, may not transmit its shock to the engine 32 (see Fig. 2), a flexible joint 34 is provided in the propeller shaft drive. The general design lends itself to such an arrangement because of the unusual length of fuselage forward of the wings.

Because of the unusually long and slim fuselage 10, the empennage 36 may be kept to small dimensions and still give the craft the desired maneuverability. The forward edges of the rudder 42 and elevator 44 should preferably be covered with suitable armor 46 and 48 to protect them against flying wreckage.

In making an attack on an enemy craft with this device the pilot preferably tries to drive the armored nose 12 through an enemy wing or other vital part of the plane attacked, depending on the propeller blades to fold up as indicated and the armored edges of the wings and empennage to withstand the impact of such flying wreckage as may reach it, and depending also on the flexible joint in the propeller shaft to protect the engine from the impact.

In the device shown in Figs. 4, 5 and 6, the fuselage 50 is made rather longer and more slender than is usual, and the wings 52 are wide where they join the fuselage but taper to a narrow outer end, thereby providing a wing which is per se well braced, although additional bracing may be provided, since, in the instant case, it is the wing which is intended to withstand the shock. For this reason the drag members in the wings should be exceptionally strong so that the outer ends of the wings may take considerable impact without breakage. For the same reason the forward half of the fuselage should be more heavily reinforced or otherwise built with an exceptionally high load factor.

The leading edges of the wings are covered and reinforced with a heavy metal member 54, which is provided with serrations 56. Member 54 or a similar member may be carried forward along the sides of the fuselage at the front end, as at 58, and may preferably extend around the outer ends of the wing tips, as at 60.

The landing gear 62 is retractable, being shiftable from the landing position shown in Fig. 5 to pockets 64 in the underside of the wings, as in Fig. 4.

The empennage 66 should be kept as small as possible, consistent with satisfactory maneuverability, and may have a layer of protective armor 68 around the front edges of the members to protect against flying wreckage, although in this exemplification of the invention this matter is less important than it is in the exemplification first described and shown in Figs. 1, 2 and 3. There the empennage is more liable to drag against the object rammed by the nose of the attacking plane, whereas, in the second exemplification, both the propeller and the empennage may be kept farther from the wreckage, when the wrecking is accomplished by a wing tip. In an attack with this form of the invention, the pilot so maneuvers his plane as to strike some vital part of the enemy plane such as the wing or the empennage with the forward saw-tooth edge or end of his own wing, and thereby so injure the part struck as to cause the enemy craft to fall out of control.

Figure 8:
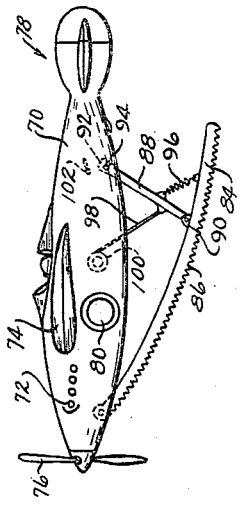
Fig. 8 is a view of the device of Fig. 7 arranged for attack.
Figure 7:
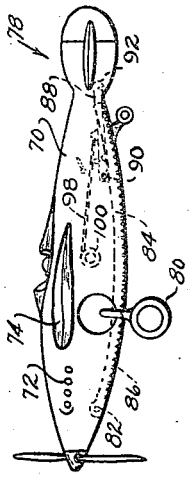
Fig. 7 is a side view of a second variant of the invention when in normal flight.

In the third embodiment of the invention, shown in Figs. 7 and 8, the plane as a whole is designed for extreme speed. The fuselage 70 is longer and more slender than is used in common practice and the engine 72 of maximum horse power possible in the space available, while the wings 74, propeller 76 and empennage 78 may follow the most approved design for speed. The landing gear 80 should be retractable.

Hinged to the underside of the fuselage near the forward end, as at 82, is a long bar 84 preferably made of steel and hardened and provided along the lower edge with saw teeth 86. A brace 88 is hinged to the upper side of the bar 84 near its rear end as at 90, the upper end of the brace being provided with a hook 92 which catches over the pin 94. A spring 96 constrains the hook 92 to remain on the pin 94 while a cable 98 extends from the bar 88 to a reel 100 in the cockpit for raising the hook off of the pin. A stop 102 limits the extent to which the brace 88 may be swung about the hinge 90 by the cable, and, after this limit has been reached, further reeling of the cable 98 retracts the bar 84 and brace 88 into a groove in the bottom of the fuselage. The bar 84 may thus be retracted and the landing gear 80 extended when a landing is to be made.

In attacking with this third form of the invention, a pilot may drive his plane in the same direction, in the opposite direction, or transversely of the enemy craft, as long as he is able to fly above and close enough to the enemy craft to drag the cutting bar 84 over some vital part of the craft being attacked.

The several variants of the invention shown and described may preferably be operated by pilots actually in the cockpits, but it will, of course, be understood that any or all of the devices shown may be operated by radio control from another plane which may follow the fighter craft, or by an operator on the ground.

Having described several embodiments of the invention whereby the objects set forth may be attained, we claim:

In a warplane of the class which comprises a fuselage with a cockpit, a retractable cutting bar, having saw teeth on its lower edge, hinged to the bottom of said fuselage at the forward end, and, when extended sloping downward away from said fuselage at the rearward end, a brace hinged to said bar near the rearward end and extending upwardly to said fuselage, a hook at the upper end of said brace, means on said fuselage for said hook to engage upon rearward swinging of the upper end, a spring biased to draw the upper end of said brace rearwardly to engage said hook, a stop to limit forward swinging of said upper end to an amount sufficient to disengage said hook, a cable secured to said brace near its hinged lower end and extending to said cockpit, and a reel in said cockpit to wind said cable, to disengage said hook, and retract said cutting bar.

ROBERT KAUCH.
CHARLES L. PAULUS.